United States Patent [19]

Shimada et al.

[11] Patent Number: 4,511,878
[45] Date of Patent: Apr. 16, 1985

[54] PRESSURE SENSOR WITH IMPROVED SEMICONDUCTOR DIAPHRAGM

[75] Inventors: Satoshi Shimada; Ken Murayama; Shigeyuki Kobori, all of Hitachi; Kanji Kawakami, Mito, all of Japan

[73] Assignees: Hitachi, Ltd.; Hitachi Const. Mach. Company, both of Tokyo, Japan

[21] Appl. No.: 534,076

[22] Filed: Sep. 20, 1983

[30] Foreign Application Priority Data

Sep. 20, 1982 [JP] Japan .................... 57-162323

[51] Int. Cl.³ .............................. G01L 9/06
[52] U.S. Cl. .................................. 338/4; 338/2; 73/720; 73/726; 73/777; 73/DIG. 4
[58] Field of Search ................ 338/42, 2-4; 73/727, 726, 721, 720, 777, DIG. 4; 29/610 SG

[56] References Cited

U.S. PATENT DOCUMENTS

| | | | |
|---|---|---|---|
| 4,050,313 | 9/1977 | Shimada et al. | 338/4 X |
| 4,173,900 | 11/1979 | Tanabe et al. | 338/42 X |
| 4,222,277 | 9/1980 | Kurtz et al. | 73/721 X |
| 4,317,126 | 2/1982 | Gragg, Jr. | 338/4 X |
| 4,322,980 | 4/1982 | Suzuki et al. | 73/727 |
| 4,376,926 | 3/1983 | Myhre | 338/4 |
| 4,399,707 | 7/1983 | Wamstad | 338/42 X |
| 4,400,681 | 8/1983 | Brown et al. | 338/4 |
| 4,467,656 | 8/1984 | Mallon et al. | 338/42 X |

FOREIGN PATENT DOCUMENTS

| | | | |
|---|---|---|---|
| 55-62331 | 5/1980 | Japan | 73/727 |
| 934258 | 6/1982 | U.S.S.R. | 73/726 |

OTHER PUBLICATIONS

Zinker, "Diffused Si—Diaphragm, Pressure Transducer", 5th Annual ISA Test Symposium, Advances in Instruments No. 68-503, New York, Oct. 1968, pp. 1–5.
Vagonov et al., "Properties of Diffusion Strain Gauge Resistances of Pressure Transducers w/ Si—Diaphragms, Measurement Techniques, Izmetitel'naya Tekhnika, vol. 16, No. 7, pp. 1004–1006, Jul. 1973.
Allan, R., "X—Shaped Sensor Simplifies Transducer", Electronics, Sep. 25, 1980.

Primary Examiner—Roy N. Envall, Jr.
Assistant Examiner—C. N. Sears
Attorney, Agent, or Firm—Antonelli, Terry & Wands

[57] ABSTRACT

Provided is a pressure sensor of semiconductor type, having a semiconductor diaphragm, wherein the diaphragm comprises at least one of thin wall parts and at least one of thick wall parts, and defines therein recesses formed in the lower surface of the diaphragm below the thin wall parts, piezoresistance elements are laid on the upper surface of the diaphragm near the thin wall parts, and a supporting member is sealingly jointed to the thick wall parts at the lower surface of the diaphragm, so that the recesses are sealed and confined so as to prevent high pressure fluid from blowing off when the thin wall part is broken.

8 Claims, 43 Drawing Figures

PRESSURE SENSOR WITH IMPROVED SEMICONDUCTOR DIAPHRAGM

The present invention relates to a pressure sensor used in a device for measuring pressure, particularly to a pressure sensor having a semiconductor diaphragm on which piezoresistance elements are laid.

Conventionally well-known is a pressure sensor of the type including a semiconductor diaphragm having the lower surface formed with a circular recess in the substantially center part of the diaphragm so that a thin wall part is formed therein and the upper surface on which piezoresistance elements are laid by a diffusion method near the periphery of the thin wall part therewith. That is, the thin wall part has the role of a deformable part and the piezoresistance elements measure the stress exerted to the deformable part.

The above-mentioned piezoresistance elements have such a nature that their resistances vary when they are strained by being subjected to stress components orthogonal together. In order to make the explanation brief, x-y coordinates are defined on the upper surface of the diaphragm with the original point of the coordinates corresponding to the center point of the diaphragm.

Usually, four piezoresistance elements are laid on the upper surface of the diaphragm in such a pattern that one pair of piezoresistance elements are positioned on the x-axis symmetrically with respect to the original point, having their longitudinal axes aligned on the x-axis, and the other one pair of piezoresistance elements are positioned on the y-axis also symmetrically with respect to the original point, having their axes extending perpendicularly to the y-axis.

Denoting here that the radial and tangential (or angular) stress components with respect to the original point of the x-y coordinates are $\sigma_r$ and $\sigma_t$ respectively, when the stress is exerted to the diaphragm, the above-mentioned piezoresistance elements $R_x$, $R_y$ produce resistance variations $\Delta R_x$, $\Delta R_y$, respectively, which are determined by the following expressions:

$$\Delta R_x = \pi_x(\sigma_r - \sigma_t) \tag{1}$$

$$\Delta R_y = -\pi_y(\sigma_r - \sigma_t) \tag{2}$$

where $\pi_x$, $\pi_y$ are piezoresistance coefficients in the direction of x- and y-axes.

As clearly understood from the above-mentioned expressions, the resistance variations are proportional to the difference between the radial and tangential stress components $\sigma_r$, $\sigma_t$, that is:

$$\Delta R_x/R_x \propto \epsilon\sigma \tag{3}$$

$$\Delta R_y/R_y \propto \Delta\sigma \tag{4}$$

where $\Delta\sigma = \sigma_r - \sigma_t$.

In the above-mentioned conventional pressure sensor, the piezoresistance elements are arranged adjacently to the periphery of the deformable part therewithin in order to enhance the sensibility of the pressure sensor since $\Delta\sigma$ becomes maximum at the periphery of the deformable part.

However, the above-mentioned conventional pressure sensor is not suitable for measuring high pressure more than 10 MPa although it is suitable for measuring low pressure. In order to measure the high pressure, it is necessary to increase the thickness of the deformable part from the view point of structural strength.

In order to understand the features and advantages of the present invention more clearly, explanation is first made to a pressure of conventional type with reference to FIGS. 1a, 1b and 1c.

A diaphragm 1 made of a planar single crystal of silicon comprises a center thin wall part 3 provided by forming a circular recess part 2 in the lower surface of the diaphragm 1, and an outer peripheral thick wall part 3 which is sealingly bonded to a support bed 5 formed therein with a piercing hole 6. The piercing hole 6 is communicated with the recess part 2 in the diaphragm 1 so that fluid in the recess part 2 is prevented from being compressed when the thin wall part 3 which serves as a deformable element susceptible to the pressure applied to the diaphragm 1, is deformed, thereby to eliminate errors in measurement due to the compression of fluid within the recess part 2.

On ther upper surface of the diaphragm 1, piezoresistance elements $R_x$, $R_y$ are formed by a diffusion method or an ion-implantation method, the piezoresistance elements $R_x$ in one pair extending with its longitudinal axis radially of the thin wall part 3 and the piezoresistance elements $R_y$ in the other pair extending with its longitudinal axis tangentially of the thin wall part 3. As clearly understood from FIG. 1c which shows the stress distribution chart of the diaphragm 1 obtained when pressure P is applied in the direction of arrow, the difference between the radial and tangential stress components $\sigma_r$, $\sigma_t$, that is, $\Delta\sigma$ is maximum at the periphery of the thin wall part 3. In view of this fact, the piezoresistance elements $(\Delta R_x/R_x)$, $(\Delta R_y/R_y)$ are laid near the periphery of the thin wall part 3 therewithin. These elements $R_x$, $R_y$ are incorporated in a Wheatstone bridge circuit.

The above-mentioned type of the conventional pressure sensor is suitable for measuring low pressure, but not suitable for measuring high pressure. In order to measure the high pressure more than 10 MPa with the use of the diaphragm 1 of the above-mentioned type, the thin wall part 3 should have a relatively large thickness h. However, the large thickness h of the thin wall part 3 causes the stress distribution produced in the vicinity of the periphery of the thin wall part 3 to be largely changed, and therefore, $\Delta\sigma$ becomes less in this section so that the problem of the lowering of measuring sensitivity and accuracy brings about. Further, when the thin wall part 3 is broken by the pressure to be measured, the high pressure medium blows off through the piercing hole 6, and abnormal signal is delivered due to the failure of the piezoresistance elements $R_x$, $R_y$.

The first object of the present invention is to provide a pressure sensor suitable for measuring high pressure.

The second object of the present invention is to provide a pressure sensor which offers no problem of the above-mentioned blow-off of high pressure medium.

The third object of the present invention is to provide a pressure sensor with high sensitivity and accuracy of measurement even under high pressure.

Accordingly, there is provided a pressure sensor of semiconductor diaphragm type, comprising a semiconductor diaphragm including at least one thin wall part formed by forming a recess in the lower surface of the diaphragm and at least one of thick wall parts, piezoresistance elements laid on the upper surface of the diaphragm near the thin wall part with a fixed pattern, and a supporting member sealingly jointed to the thick wall part at the lower surface of the diaphragm, thereby a space defined by the diaphragm and the supporting member below the thin wall part is sealed and confined so as to prevent high pressure medium from blowing off when the thin wall part is broken.

According to the other aspect of the present invention, there is provided a pressure sensor comprising a semiconductor diaphragm having at least one of thin wall parts formed by forming a recess or recesses in the lower surface of the diaphragm, the thin wall parts having such a thickness and a shape that local flexibility arises in the upper surface of the diaphragm and at least one of the thick wall parts, piezoresistance elements laid on the upper surface of the diaphragm in an area where the local flexibility arises, and a supporting member jointed to the thick wall parts at the lower surface of the diaphragm, for supporting the latter.

In view of this arrangement, the susceptivity and accuracy of measurement can be enhanced even in high pressure measurement.

Further, according to the another aspect of the present invention, there is provided a pressure sensor comprising a semiconductor diaphragm formed with at least one of grooves recessed in the lower surface of the diaphragm and surrounding the center part of the latter so as to form at least one of thin wall part and at least one of thick wall parts in the diaphragm, piezoresistance elements laid on the upper surface of the diaphragm within the thin wall parts, and a supporting member jointed to the thick wall parts at the lower surface of the diaphragm.

In view of this arrangement, there can be provided a pressure sensor having structural strength standing against high pressure of more than 100 MPa and as well having high reliability and stability for measuring pressure in a wide range.

Other objects and aspects of the present invention will become apparent from the following description of embodiments with reference to the accompanying drawings in which:

FIGS. 1a, 1b and 1c show illustrations for explaining conventional pressure sensor, among which FIGS. 1a and 1b are plan and cross-sectional views and FIG. 1c is a diagram of stress distribution obtained in a semiconductor diaphragm of the pressure sensor shown in FIGS. 1a and 1b;

FIGS. 2a and 2b show illustrations for explaining the principle of one aspect of the present invention, among which FIG. 2a is a cross-sectional view of a pressure sensor according to the present invention, and FIG. 2b is a diagram of stress distribution;

FIGS. 3a and 3b show illustrations of a first embodying form of the present invention, of which FIG. 3a is a plane view and FIG. 3b is a cross-sectional view;

Figure 4:
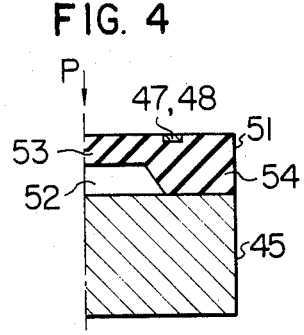
FIGS. 4 and 5 show illustrations of variant forms of the first embodying form depicted in their cross-sections.
Figure 8A:
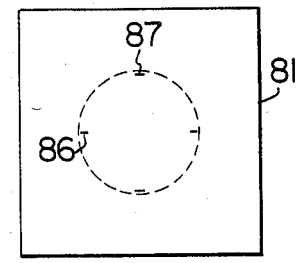
Figure 8B:
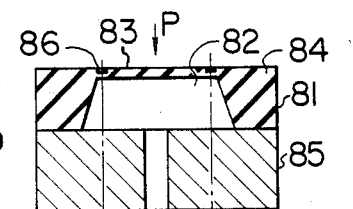
Figure 8C:
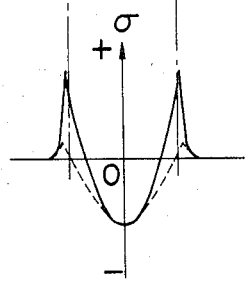
Figure 7A:
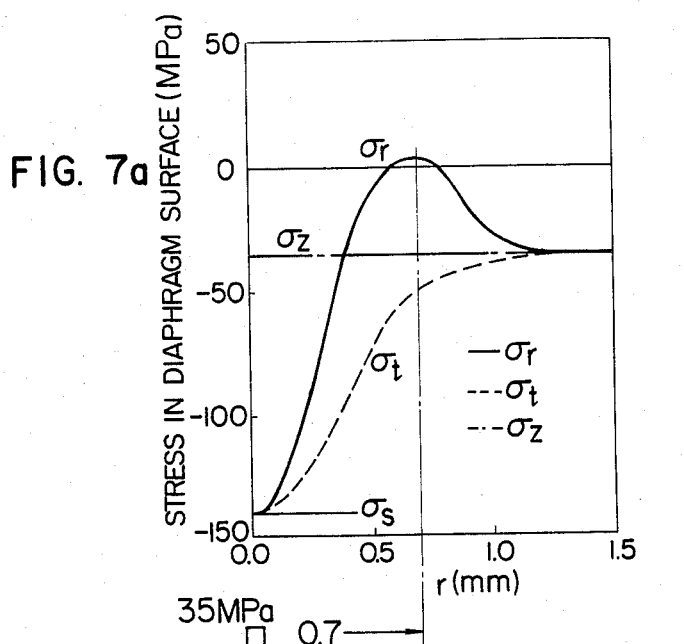
Figure 7B:
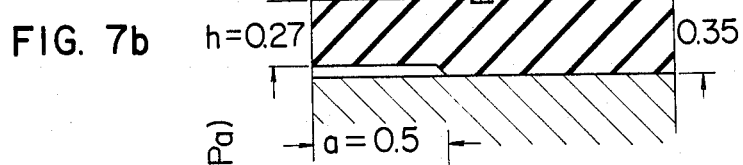
Figure 7C:
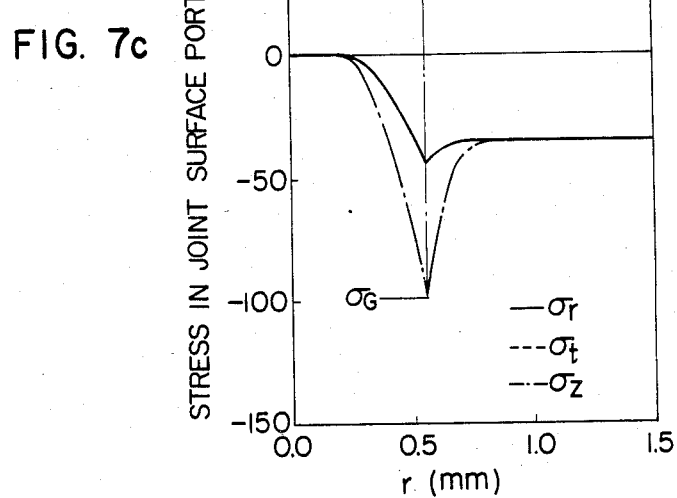
Figure 9A:
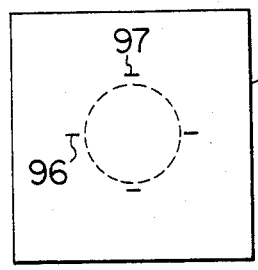
Figure 9B:
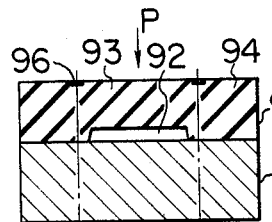
Figure 9C:
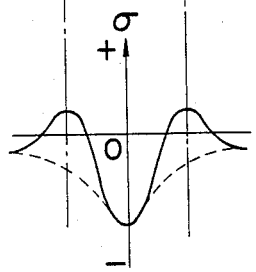
Figure 11A:
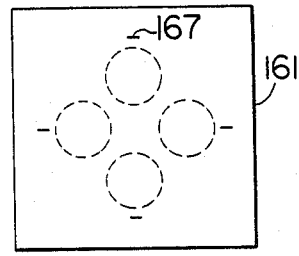
Figure 11B:
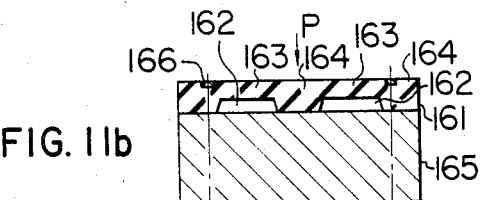
Figure 11C:
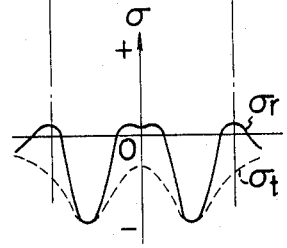
Figures 1, 10A:
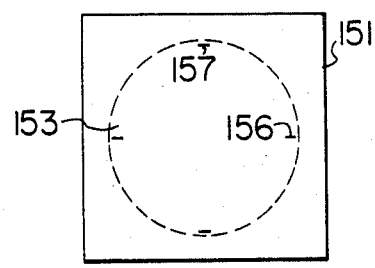
Figures 2, 10A:
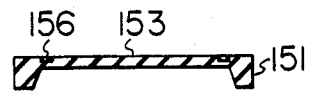
Figures 1, 10B:
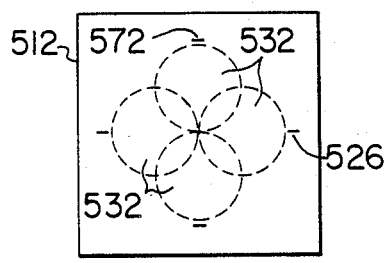
Figures 2, 10B:
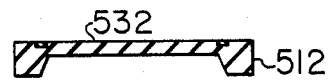
Figures 1, 10C:
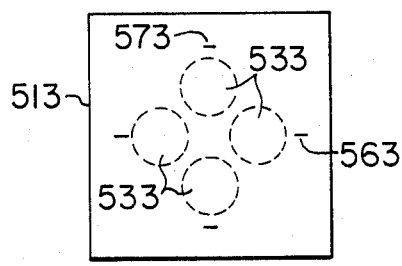
Figures 2, 10C:
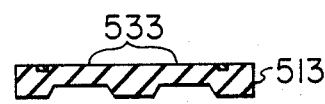
Figure 12:
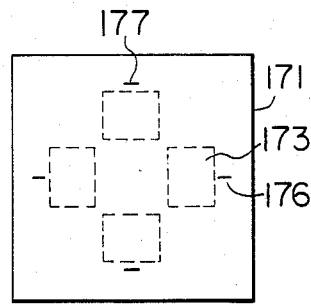
Figure 13A:
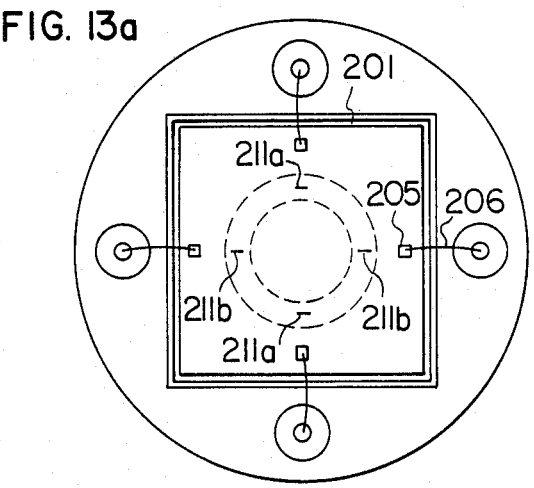
Figure 13B:
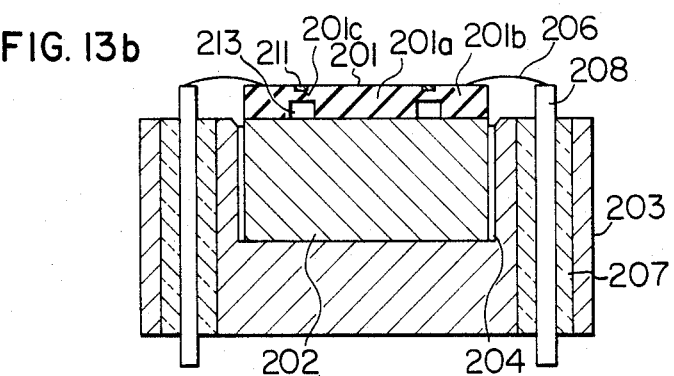
Figure 14:
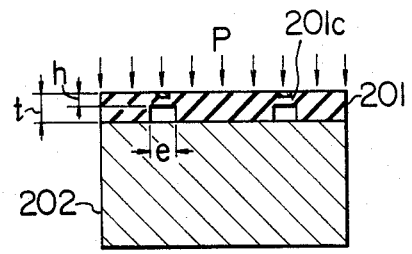
Figure 15:
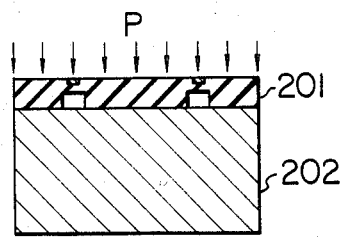
Figure 16:
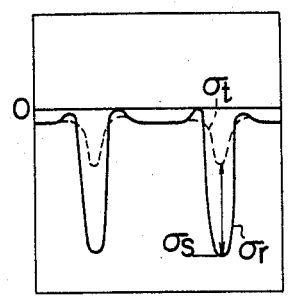
Figure 16:
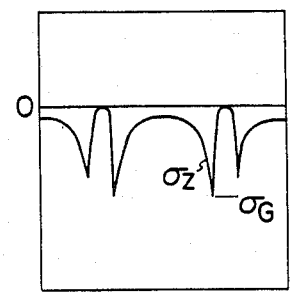
Figure 16:
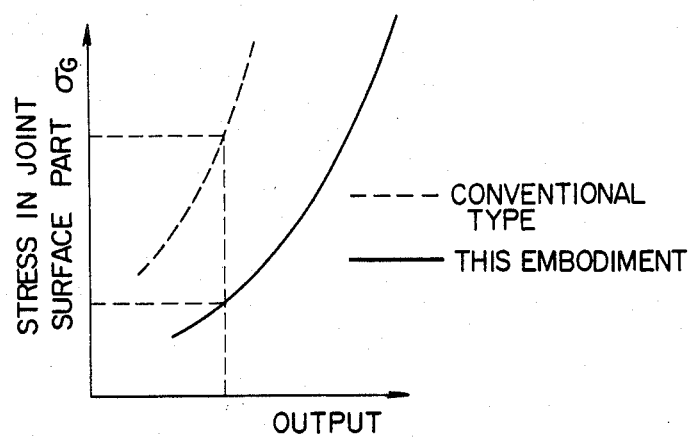
Figure 17:
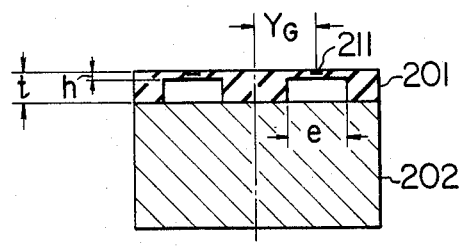
Figure 18:
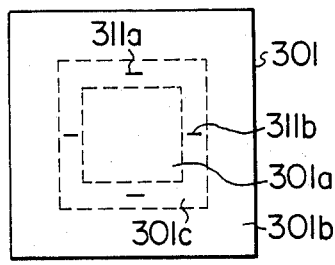
Figure 20:
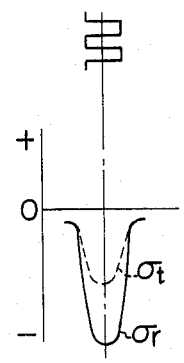
Figure 19:
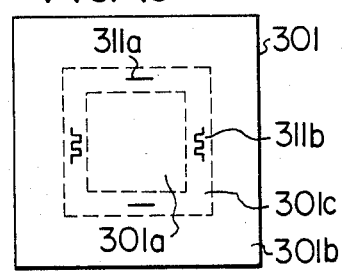
Figure 21:
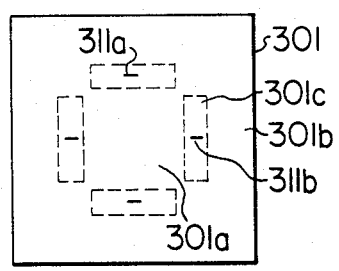
Figure 22A:
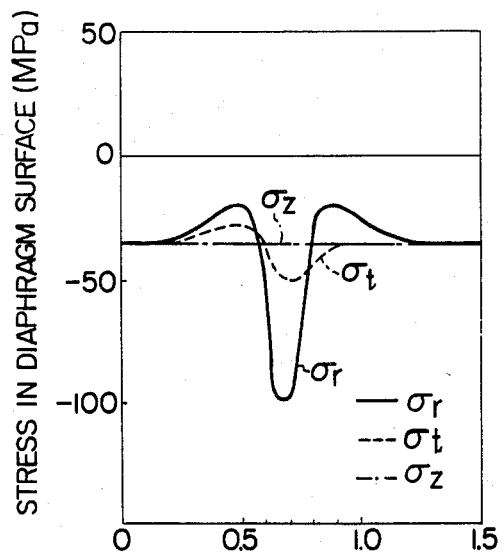
Figure 22B:
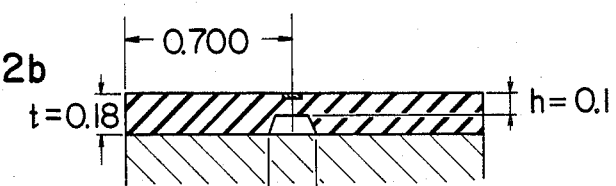
Figure 22C:
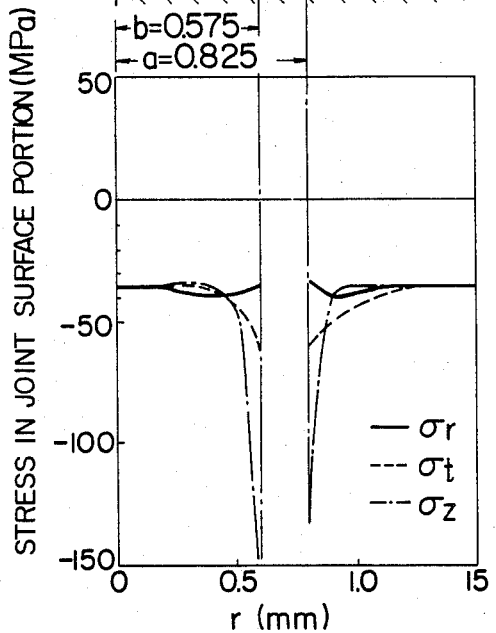

FIGS. 7a, 7b and 7c show illustrations for explaining the result of experiment relating to one example form of the pressure sensor shown in in FIG. 4, among which FIG. 7a is a diagram of stress distribution obtained in the diaphragm, FIG. 7b is a cross-sectional view of the pressure sensor, and FIG. 7c is a diagram of stress distribution obtained at the mating surface portion between the diaphragm and the supporting member;

FIGS. 8a, 8b and 8c show illustrations for explaining a pressure sensor for low pressure constructed according to the first embodying form of the present invention, among which FIGS. 8a and 8b are plan and cross-sectional views, and FIG. 8c is a diagram of stress distribution;

FIGS. 9a, 9b and 9c show illustrations for explaining a pressure sensor for high pressure constructed according to the first embodying form of the present invention, among which FIGS. 9a and 9b are plan and cross-sectional views, and FIG. 9c is a diagram of stress distribution;

FIGS. 10a-1, 10a-2, 10b-1, 10b-2, 10c-1 and 10c-2 show illustrations for explaining a second embodying form of the present invention, among which FIGS. 10a-1 and 10a-2 are plan and cross-sectional views of a diaphragm for low pressure, FIGS. 10b-1 and 10b-2 are plan and cross-sectional views of a diaphragm for medium pressure, and FIGS. 10c-1 and 10c-2 are plan and cross-sectional view of a diaphragm for high pressure;

FIGS. 11a, 11b and 11c show illustrations for explaining the principle of the second embodying form of the present invention, among which FIGS. 11a and 11b are plan and cross-sectional views, and FIG. 11c is a diagram of stress distribution;

FIG. 12 shows an illustration of a variant form of the second embodying form of the present invention depicted in its plan view;

FIGS. 13a and 13b are illustrations for showing a third embodying form of the present invention, among which FIG. 13a is a plan view and FIG. 13b is a cross-sectional view;

FIG. 14 is a diagram of stress distribution obtained in a diaphragm used in the third embodying form of the present invention, illustrating corresponding to the cross-section thereof;

FIG. 15 is a diagram of stress distribution obtained at the mating surface portion between the diaphragm and the supporting member, illustrating corresponding to the cross-section of the pressure sensor of the third embodying form;

FIG. 16 shows an illustration for explaining an advantage of the third embodying form of the present invention in comparison with conventional pressure sensors;

FIG. 17 shows an illustration for explaining the principle of the third embodying form of the present invention, in which the pressure sensor of the third embodying form is shown in its cross-section;

FIG. 18 is a plan view of a first variant form of the third embodying form of the present invention;

FIG. 19 is a plan view of a second variant form of the third embodying form of the present invention;

FIG. 20 is a diagram of stress distribution obtained, corresponding to a piezoresistance element used in the sensor shown in FIG. 19;

FIG. 21 is a plan view of a third variant form of the third embodying form of the present invention;

FIGS. 22a, 22b and 22c show illustrations for explaining the result of experiment relating to one example form of the pressure sensor shown in FIG. 17, among which FIG. 22a is a diagram of stress distribution obtained in the diaphragm, FIG. 22b is a cross-sectional view of the pressure sensor, and FIG. 22c is a diagram of stress distribution obtained at the mating surface portion between the diaphragm and the supporting member.

A first embodiment of the pressure sensor in accordance with the invention will be described hereinunder with reference to FIGS. 2a to 3b. Before turning to the description of the embodiment, an explanation will be made as to the principle of the invention.

Figure 1A:
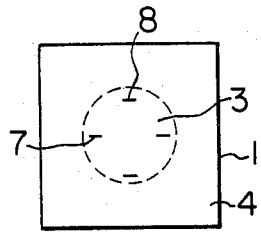
Figure 1B:
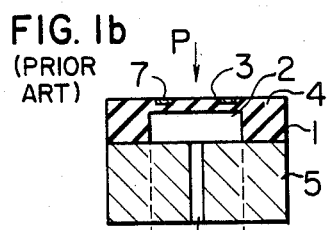
Figure 1C:
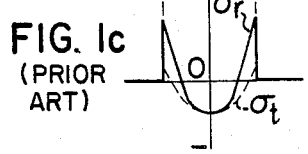

An analysis was conducted by a finite element method (FEM) to examine the condition of stress developed in the surface of a diaphragm having a thin wall part of an increased thickness. The analysis showed such a result that the pressure P applied to this diaphragm in a manner shown in FIG. 2a produces in the pressure receiving surface of the same a stress distribution as shown in FIG. 2b which is entirely different from that explained before in connection with FIG. 1a.

Figure 2A:
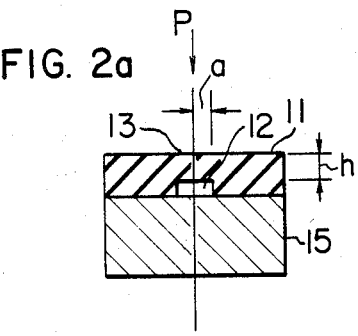

More specifically, FIG. 2a is a sectional view of an essential portion of a pressure sensor for high pressure. As in the case of the conventional pressure sensor shown in FIG. 1a, the diaphragm 11 of the sensor shown in FIG. 2a is composed of a silicon single crystal plate provided in the lower surface thereof with a recess 12 and has a thin wall part 13 having a circular planar shape. The diaphragm 11 is fixed to a supporting member 15. On the other hand, FIG. 2b is a stress distribution diagram showing the stress distribution in the surface of the diaphragm 11, in which the axis of abscissa shows the position of the axis of the circular thin wall part on the diaphragm surface corresponding to that shown in FIG. 2a, while the axis of ordinate shows the level of the stress.

Figure 2B:
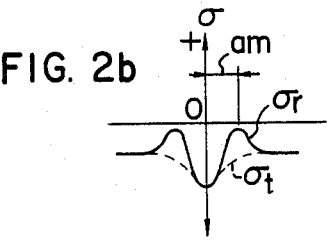

As will be seen from FIG. 2b, no substantial difference is observed between the radial stress $\sigma_r$ shown by the full line and the tangential stress $\sigma_t$ shown by broken line, within the area of the thin wall part having a radius a. The difference $\Delta\sigma$ between these stresses $\sigma_r$ and $\sigma_t$ takes the maximum value in the region near the periphery of the thin wall part. It is to be noted also that the position at which the difference $\Delta\sigma$ takes the maximum value substantially approximates the position $a_m$ where the stress $\sigma_r$ takes the maximum value, and that the position $a_m$ can be determined by the following formula (5).

$$a_m \propto f[(a/h)^2 P] \qquad (5)$$

It is thus possible to determine the position where $\Delta\sigma$ takes the maximum value, i.e. the position where $\Delta R_x$ and $\Delta R_y$ take large values. By forming the piezoresistance elements by diffusion at such positions, it is possible to obtain a pressure sensor capable of performing a measurement at a high sensitivity and a high precision. In FIG. 2b, the stresses $\sigma_r$ and $\sigma_t$ are wholly shifted to the negative side, because the stress of a level corresponding to the increment of the measured pressure is applied to the whole portion of the diaphragm.

Namely, when the pressure to be measured is high, stress is caused also in the thick wall part, due to a phenomenon called "local flexibility" (resilient deformation in a solid part). The stressing of the thick wall part due to this phenomenon takes place when the pressure-receiving surface of the diaphragm 11 is flat and smooth.

Figure 3A:
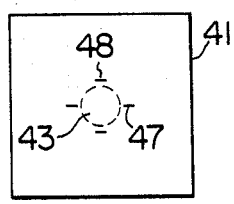
Figure 3B:
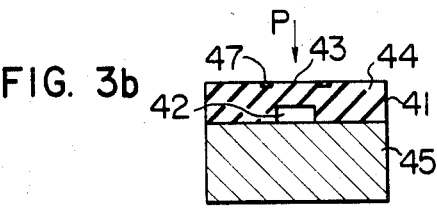

FIGS. 3a and 3b show a first embodiment of the invention in plan and in section, respectively. The size and shape of this embodiment is same as those shown in FIG. 2a. Referring to these Figures, the pressure sensor of the first embodiment has a diaphragm 41 made from a silicon single crystal plate provided at its lower side with a circular recess 42 which presents a rectangular section in a vertical plane. The silicon single crystal plate has an N-type {100} crystalline surface. The diaphragm 41 is supported by a supporting member 45 fixed to the lower side of the thick wall part 44. Piezoresistance elements $R_x$ 47 and $R_y$ 48 are formed on the portions of the surface of the diaphragm 41 adjacent to the circular thin wall portion defined by the recess 42. More specifically, two piezoresistance elements $R_x$ 47 and two piezoresistances elements $R_y$ 48 are extended, respectively, in the radial and tangential directions of the circular thin wall part, in a direction coinciding with the {110} axis of the silicon single crystal. These piezoresistance elements are incorporated in a Wheatstone bridge circuit.

According to this arrangement, the maximum value of the difference between the stresses $\sigma_r$ and $\sigma_t$ generated by the pressure applied to the diaphragm shown in FIG. 2b appears in the positions where the piezoresistance elements are disposed, so that $\Delta R_x$ and $\Delta R_y$ expressed by formula (1) and (2) take large values. In consequence, the sensitivity is enhanced and, since the stress distribution is flat, any fluctuation of the measurement due to deviation of the positions of piezoresistance elements is eliminated to ensure an extremely high precision of measurement.

According to the first embodiment of the invention, therefore, it is possible to attain a high sensitivity and precision of the pressure sensor even with a diaphragm having a thin wall part of an increased thickness.

The pressure sensor of this first embodiment offers the following additional advantages.

Namely, even if the thin wall part is broken due to a too high pressure applied thereto, the piezoresistance elements remain safe to permit the Wheatstone bridge to produce an output voltage which is equal to that produced when the pressure applied to the sensor is zero, thereby to eliminate troubles or confusions which may be caused by emission of an abnormal output signal. In addition, the fluctuation of atmospheric pressure of an order of 10 kPa can be neglected because the pressure to be measured is as high as, for example, 10 MPa. This in turn eliminates the necessity for piercing hole for atmospheric pressure compensation in the supporting member 45, so that the blowing off of the high-pressure fluid is avoided to further ensure the safety in the operation of the pressure sensor.

In the described first embodiment of the invention, the recess formed in the lower side of the diaphragm for presenting the thin wall part has a rectangular vertical section. The present inventors have found, however, that the stress diffrence $\Delta\sigma$ can be increased by taking a suitable sectional shape of the recess, as will be understood from the following description of modifications of the first embodiment having various sectional shapes of the recess.

Figure 5:
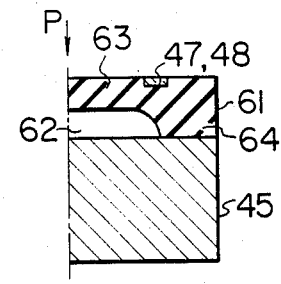

FIGS. 4 and 5 are sectional views of essential parts of a first modification and a second modification, respectively. In these Figures, the same reference numerals are used to denote the same parts or members having same functions as those used in FIGS. 3a and 3b. As in the first embodiment shown in FIGS. 3a and 3b, the modifications shown in FIGS. 4 and 5 have a diaphragm made of a N-type silicon single crystal plate having {100} crystalline surface.

The first modification shown in FIG. 4 has a trapezoidal vertical sectional shape of the recess 52 formed in the lower surface of the diaphragm 51. Piezoresistance elements $R_x$ 47 and $R_y$ 48 are formed and arranged on the portions of the diaphragm surface corresponding to the peripheral edges of the smaller end of the trapezoidal form of the recess 52.

On the other hand, the second modification shown in FIG. 5 has a recess 62 of a substantially trapezoidal vertical section having rounded edges. The piezoresistance elements $R_x$ 47 and $R_y$ 48 are formed and arranged on the portions of the diaphragm surface corresponding to the rounded edge of the substantially trapezoidal vertical section of the recess 62.

Figure 6A:
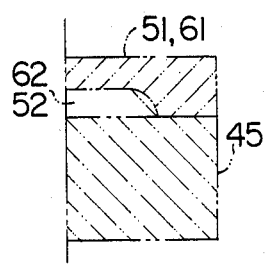
FIG. 6 show a diagram of stress distribution obtained in diaphragms used in the variant forms shown in FIGS. 4 and 5, illustrating corresponding to the cross-sections thereof.
Figure 6B:
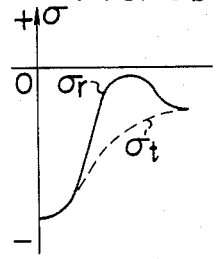

As a pressure P as indicated by an arrow in each of FIGS. 4 and 5 is applied, a stress distribution shown by full-line $\sigma_r$ and broken-line $\sigma_t$ in FIG. 6 is formed in the surfaces of the diaphragms 51 and 61.

As will be understood from FIG. 6, the stress difference $\Delta\sigma$ takes the maximum value in the region around the transient portions between the thin wall part 53, 63 and the thick wall part 54, 64. Since the piezoresistance elements 47 and 48 are disposed in such a region, the sensitivity and accuracy of the pressure measurement can be increased further to the first embodiment explained in connection with FIG. 3.

The recess of the first modification having the sectional shape as shown in FIG. 4 can be obtained through an etching by means of an aqueous solution of potassium hydroxide. Namely, this recess can be formed by a process in which the etching is effected in such an anisotropic manner that the etching speed is the highest in the {100} surface and smallest in the {100} surface. On the other hand, the recess of the second modification having the sectional shape as shown in FIG. 5 can be formed by an etching by means of an aqueous solution of nitric acid. Thus, the practically obtainable shape of the recess conveniently coincides with the shape of the recess which produces the advantageous effect offered by the present invention.

Needless to say, the invention does not exclude the formation of the recess by measures other than the described chemical etching, e.g. by mechanical processing such as supersonic wave processsing or polishing. The adoption of the chemical etching, however, is preferred from the view point of damage caused on the crystal, strength and precision of the processing, as well as from the view point of the yield or production efficiency.

In order to make sure of the detection of the position where the difference between the stresses $\sigma_r$ and $\sigma_t$ is maximized, the size of the piezoresistance element is minimized as much as possible. For instance, a pressure sensor for 350 atm., having piezoresistance elements arranged in accordance with the minute stress calculation by finite element method, showed the expected high sensitivity and a linearity of less than 0.2%. In the first embodiment and two modifications thereof explained hereinbefore, a borosilicate glass, which exhibits a small difference of thermal expansion coefficient from that of the silicon diaphragm, is used as the material of the supporting member. In order to minimize the thermal strain which is caused during bonding of the diaphragm and the supporting member to each other, the diaphragm and the supporting member are bonded to each other by an electrostatic bonding method which makes use of inter-ion forces produced in the bonding surfaces due to movement of the Na ions in the borosilicate glass caused by an application of a D.C. voltage of 1000 V while heating both of the diaphragm and the supporting member up to 400° C. which is below the melting points of the two materials.

Although the diaphragm used in the described embodiment has a square form with a circular thin wall portion formed therein, these shapes of the diaphragm and the thin wall part are not exclusive. For instance, an equivalent effect to the described embodiment can be obtained with the use of a circular diaphragm provided with a square thin wall part. Thus, with the described embodiment of the invention, it is possible to attain a higher sensitivity and accuracy of the pressure measurement even with an increased thickness of the diaphragm.

EXPERIMENT 1

Stress distribution was measured on a diaphragm of the type shown in FIG. 5 having an overall width W of 1.5 mm, wall thickness h of thick wall part of 0.35 mm, wall thickness h of thin wall part of 0.27 mm and a radius a of thin wall part of 0.5 mm, the result of which is shown in FIGS. 7a, 7b and 7c. The stress $\sigma_r$ takes the maximum value at a position ranging between 1.25a and 1.4a from the center of the diaphragm, i.e. the center of the thin wall part. The stress difference $\Delta\sigma = \sigma_r - \sigma_t$ takes the maximum value at this position. Therefore, the piezoresistance elements are preferably disposed in the area which radiates from the center of the diaphragm by a distance ranging between 1.25a and 1.4a.

FIG. 7c illustrates the stress appearing in the surface of bonding between the diaphragm and the borosilicate glass constituting the supporting member.

Assume here that two pressure sensors, i.e. a pressure sensor for a low pressure and a pressure sensor for a high pressure, are formed in accordance with the first embodiment of the invention. In the pressure sensor for low pressure, the thin wall part 43, 53 or 63 has a comparatively small thickness and a comparatively large radius, whereas, in the pressure sensor for high pressure, the thin wall part has a comparatively large thickness and a comparatively small diameter. Thus, the point of difference between the pressure sensor for low pressure and the pressure sensor for high pressure, both made from thin silicon wafer, resides in the shape and size of the thin wall part as a natural result from the view point of the strength. The difference resides also in the positions of the piezoresistance elements, i.e. the radial distances of the piezoresistance elements from the center of the diaphragm. Such differences uneconomically raises the production costs of the sensors and undesirably increases the number of the steps of the production process. In addition, it is not allowed to extremely reduce the radius of the thin wall part because there is a certain minimum size of the piezoresistance element.

This in turn gives a rise to a demand for a pressure sensor which can cover a wide range of the pressure sensor including low and high pressures, using the same piezoresistance element positions (referred to as "resistor pattern", hereinunder).

One of the solutions or approaches which are attempted in recent years is to use a silicon wafer of a comparatively large thickness t of about 0.5 to 2.0 mm. This solution will be explained hereinunder with reference to FIGS. 8a to 9c. FIGS. 8a to 8c shows a pressure sensor for low pressure (several atm. or less), while FIGS. 9a to 9c shows a pressure sensor for high pressure (higher than several tens of atm.). Both of the pressure sensors employ diaphragms made from thick silicon wafers of a thickness t ranging between 0.5 and 2 mm or so. The pressure sensor for low pressure as shown in FIGS. 8a and 8b has a thin wall part 83 of a shape similar to that obtained with the thin silicon wafer, and shows a stress distribution as shown in FIG. 8c. On the other hand, the pressure sensor for high pressure produced from the thick silicon wafer, shown in FIGS. 9a and 9b, is provided with a thin wall part 43 which can have a sufficiently large thickness thanks to the large thickness of the material silicon wafer. In the pressure sensor for high pressure, therefore, it is not necessary to decrease the radius of the thin wall part 43. It will be understood that, by using the material silicon wafer of a large thickness, it is possible to produce pressure sensors for various pressures from low pressure to high pressure, using the same resistor pattern. In FIGS. 8a to 9c, reference numerals 81 and 91 denote silicon wafers, 92 denote a recess, 84 and 94 denote thick wall parts, 85 and 95 denote supporting members, and 96 and 97 denote piezoresistance elements.

The recess 82 of the pressure sensor for low pressure as shown in FIGS. 8a and 8b, however, has a large depth and, hence, is difficult to process. The recess 82 is formed usually by chemical etching which provides a constant etching speed, so that the etching time is increased to raise the production cost uneconomically when the depth of the recess is large. In addition, the prolonged processing time imposes another problem that the piezoresistance elements 86 and 87 are corroded by the etching solution. Furthermore, the thick material silicon wafer are generally expensive.

To obviate thee problems, the present invention provides as its second embodiment a less-expensive and reliable pressure sensor capable of covering a wide range from low pressure to high pressure, using the same resistor pattern.

The basic concept of the second embodiment of the invention will be described hereinunder with specific reference to FIGS. 10a-1 to 10c-1. More specifically, FIGS. 10a-1 and 10a-2 show silicon diaphragms of a pressure sensor for low pressure, while FIGS. 10b-1, 10b-2 and 10c-1, 10c-2 show those of pressure sensors for medium and high pressures, respectively.

The silicon diaphragm 151 of the pressure sensor for low pressure as shown in FIGS. 10a-1 and 10a-2 has the same shape as that of the first embodiment, and is provided with four piezoresistance elements 157 and 156 arranged around the thin wall part thereof.

The pressure sensor for medium pressure shown in FIGS. 10b-1 and 10b-2 have four piezoresistance elements 562 and 572 arranged around four independent thin wall parts 532 which lap one another at the central portion of the silicon diaphragm 512. This arrangment is adopted because, in the pressure sensor for medium pressure, it is necessary to reduce the radius of each thin wall part 532 as compared with the case of the pressure sensor for low pressure shown in FIGS. 10a-1 and 10a-2. In other words, the thin wall part 153 of the pressure sensor for low pressure can be regarded as being a superposition of four thin wall parts 532 in the pressure sensor for medium pressure. In the pressure sensor for high pressure as shown in FIGS. 10c-1 and 10c-2, four independent thin wall parts 533 are completely isolated so as to correspond to four piezoresistance elements 563 and 573.

The arrangement shown in FIGS. 10c-1 and 10c-2, having independent and isolated thin wall parts corresponding to respective piezoresistance elements, offers a greater degree of freedom of radius of the thin wall part. Accordingly, it is possible to produce pressure sensors for large variety of pressures from low pressure to high pressure from thin silicon wafers using the same resistor pattern.

A practical example of the second embodiment of the invention will be described hereinunder with reference to FIGS. 11a to 11c. This example of the second embodiment is designed and constructed for use under a high pressure on the order of several hundreds of atm. FIGS. 11a and 11b are a plan view and a sectional view of the second embodiment, while FIG. 11c is a stress distribution diagram as obtained with this embodiment. The stress distribution was obtained through an analysis by definite element method.

Four circular recesses 162 are formed in a silicon diaphragm 161 made from a silicon signal crystal to provide thin wall parts 163 recessed in a thick wall part 164. The thick wall part 164 is sealingly jointed at its lower surface to the supporting member 165. Borosilicate glass, which exhibits a thermal expansion coefficient substantially equal to that of the silicon, is used as the material of the supporting member 165. The supporting member 165 is jointed to the silicon diaphragm 161 by means of a glass having a low melting point. The silicon diaphragm 161 has a thickness of 0.2 mm at its thick wall part 164 and a side length of 3 mm. The recesses 162 are formed usually by alkali etching.

Four piezoresistance elements, i.e. two elements $R_x$ 166 and two elements $R_y$ 167 are formed in the peripheries of corresponding one of the four circular thin wall parts 163, and are incorporated in a Wheatstone bridge circuit. If the silicon diaphragm 161 is formed n-type silicon, the piezoresistance elements are formed from p-type silicon. However, it is possible to form the diaphragm and the piezoresistance elements from p-type silicon and n-type silicon, respectively. The crystalline orientation of the surface for forming the piezoresistance elements 166 and 167 may by (100) and (110), although in the described embodiment the use of the (100) surface is preferred from the view point of the balance of output between the radial and tangential piezoresistance elements.

In operation, as a pressure P is applied in the direction of the arrow from the upper side of the silicon diaphragm 161, four independent thin wall parts 163 are deformed. FIG. 11 shows the stress distribution in the upper surface of the silicon diaphragm 161, in which the axis of abscissa represents the distance from the center of the silicon diaphragm, while the axis of ordinate represents the stress $\sigma$. Curves $\sigma_r$ and $\sigma_t$ show, respectively, the radial stress and the tangential stress. The output sensitivity of the bridge circuit constituting the sensor varies in proportion to the difference $\Delta\sigma$ between the radial stress $\sigma_r$ and the tangential stress $\sigma_t$ generated in the piezoresistance elements 166 and 167. Therefore, the piezoresistance elements 166 and 167 are preferably disposed in the thick wall part 164 near the peripheries of the thin wall parts 163 where the stress difference $\Delta\sigma$ is large. More specifically, each piezoresistance element is preferably positioned within an area between $1.2a$ and $1.4a$ from the center of the corresponding circular thin wall part, where $a$ represents the radius of the thin wall part. This is because, in this case, the thick wall part 164 is elastically deformed under the high pressure of more than several hundreds of atm. due to the comparatively large thickness of the thin wall part 163.

It was confirmed that the Wheatstone bridge produces an output of 70 mV/2.5 V, when the radius and the thickness of each thin wall part are selected to be about 0.2 mm and 0.1 mm, respectively.

The second embodiment of the invention described hereinbefore offers the following advantages.

Firstly, it is to be understood that the pressure sensor for high pressure can be produced by making a common use of the resistor pattern with the pressure sensors for low pressure such as several atms. This conveniently reduces the number of steps in the production process and, hence, the production cost. In addition, pressure sensors for various pressures can be produced by varying only the radius of the thin wall parts 163 while maintaining a constant wall thickness of the thin wall part 163. Usually, the thin wall part 163 is formed by an alkali etching by means of an aqueous solution of potassium hydroxide, and the etching time is increased in proportion to the increases of the etching depth. Therefore, if the pressure sensors for high pressure and low pressure have an equal wall thickness of the thin wall part, these pressure sensors require an equal time length for the processing by etching, so that the administration or management of the production can be facilitated advantageously.

Furthermore, thanks to the use of a thin silicon wafer of 0.2 mm thick as the material, the thin wall part can be formed by an etching of a depth of 0.01 to 0.08 mm which can be completed in quite a short period of time.

To the contrary, it is possible to produce pressure sensors for high pressure and low pressure by varying solely the plate thickness while maintaining constant radius of four circular thin wall parts 163 in FIG. 11a.

FIG. 12 is a plan view of a silicon diaphragm of a modification of the second embodiment of the invention. In this modification, the thin wall parts 173 are made to have rectangular forms, and the piezoresistance elements are arranged in parallel with or at a right angle to the adjacent edge of corresponding thin wall parts 173 to realize an efficient application of the stress, thereby to increase the output sensitivity. A similar effect can be obtained by making the thin wall part have other form than rectangle.

Thus, according to the second embodiment of the invention, it is possible to produce pressure sensors for various pressures, i.e. pressure sensors for low pressure such as several atoms, medium pressure and high pressure such as several hundreds of atoms, can be produced with a single resistor pattern, i.e. an equal arrangement of the piezoresistance elements on the silicon diaphragm. In consequence, the gauge diffusion step in the semiconductor process is uniformalized to lower the production cost and, at the same time, to mass-produce pressure sensors for high-pressure and low-pressure simultaneously.

FIGS. 13a and 13b show a third embodiment of the invention. This embodiment has a silicon diaphragm 201 made of a silicon single crystal. The silicon diaphragm 201 is provided at its lower side with an annular recess so that it has an equal thickness at the central and peripheral portions thereof. The silicon diaphragm 201 has a square form having a side length of 3 mm and a wall thickness of 0.18 mm at the thick wall part thereof. Four piezoresistance elements 211a, 211a, 211b and 211b are formed on the regions of the major surface of the diaphragm 201 corresponding to the annular recess. More specifically, the piezoresistance elements 211a are extended in the direction tangent to the annular recess, while the piezoresistance elements 211b are arranged in the radial direction of the annular recess. These piezoresistance elements 211a, 211a, 211b and 211b are incorporated in a Wheatstone bridge and are led to aluminum electrodes 205 which are formed by evaporation on the diaphragm surface.

The diaphragm 201 has a strain generating portion constituted by a thin wall part 201c provided by the annular recess. The area outside the thin wall part 201c constitutes a peripheral thick wall part 201b while the area inside the thin wall part 201c constitutes a central thick wall part 201a. The diaphragm 201 is bonded at the reverse side of the peripheral and central thick wall parts 201b and 201a to the major surface of a base 202 which is made of, for example, borosilicate glass. The bonding of the diaphragm 201 to the base 202 is made by means of an adhesive such as a glass having a low melting point. The base 202 in turn is affixed to a pressure conducting member 203 through an adhesive 207. The aforementioned aluminum electrodes 205 on the silicon diaphragm 1 are led through wires 206 to leads 208 which are fixed to the pressure conducting members 203 while being insulated from the latter by means of glass.

In the semiconductor pressure sensor thus constructed, the diaphragm 201 is bonded to the base 2 at the peripheral and central thick wall parts 201b and 201a so that a reference chamber 213 is formed in the strain generating portion. The pressure sensor, therefore, operates as an absolute-pressure reference type pressure sensor with respect to the pressure in the reference chamber 13. According to the Boile-Charlke Law, the pressure change $\Delta P$ in the reference chamber 13 is as small as about 0.3 Kg/cm$^2$ for a temperature change of 100° C. Such a small pressure change is negligible when the pressure applied is on the order of several hundreds of kilogrammes per square centimeters (Kg/cm$^2$).

FIG. 14 shows the stress distribution in the surface of the silicon diaphragm 201 of the described semiconductor pressure sensor, when a pressure P is applied thereto, was analyzed by finite element method. Referring to this Figure, the thickness h of the strain generating portion is 0.1 mm, while the width e of the same is 0.15 m. The peripheral thick wall part 201b and the central thick wall part 201a have an equal thickness t of 0.18 mm. The output corresponding to the pressure is in proportion to the difference between the radial stress $\sigma_r$ and the tangential stress $\sigma_t$ at the positions of the piezoresistance elements. From FIG. 14, it will be seen that this pressure sensor has a sufficient sensitivity. It will be understood also that the maximum stress $\sigma_s$ generated in the silicon diaphragm 201 is reduced by about 30% as compared with conventional pressure sensor for obtaining an equal level of output.

According to this arrangement, the ratio h/t between the thickness h of the strain generating portion and the thickness t of the thick wall part can be decreased to, for example, 0.5 or so, so that distinctive border exists between the stationary part and the strain generating portion to permit the formation of the piezoresistance elements 211a, 211b on the thin wall part 201c constituting the strain generating portion. In consequence, the piezoresistance elements are less susceptive to the influence of bonding of the diaphragm to the base and also to the influence of the base, so that the reliability and stability of the pressure sensor is increased advantageously. FIG. 15 shows a pressure distribution on the joint surface between the silicon diaphragm 201 and the base 202. According to this arrangement, the diaphragm is fixed at its central portion to increase the rigidity thereof, so that the maximum stress $\sigma_G$ is decreased as compared with the conventional pressure sensor incorporating a diaphragm having an increased thickness at the center thereof. FIG. 15 shows the relationship between the output corresponding to the pressure and the maximum stress $\sigma_G$ appearing in the joint surface. It will be understood that the maximum stress $\sigma_G$ for obtaining an equal level of output can be decreased to about 50% as compared with the conventional pressure sensor. This feature is advantageous particularly in the case where the base 2 is made from borosilicate glass which has a thermal expansion coefficient substantially equal to that of the silicon but has only a small strength.

This third embodiment of the invention described hereinbefore offers the following advantages. Namely, according to this embodiment, it is possible to easily make the pressure sensor adaptable to a large variety of pressure solely by changing two parameters: namely the width e and thickness h of the strain generating portion, without requiring any change of the position $r_G$ of the piezoresistance element shown in FIG. 17. The difference $(\sigma_r - \sigma_t)$ between the radial stress $\sigma_r$ and the tangential stress $\sigma_t$, proportional to the level of output from the pressure sensor, takes the maximum value at the center of the annular recess of the thin wall part 201c constituting the strain generating portion. Therefore, the piezoresistance element can always produce the maximum output insofar as its neutral axis is maintained in alignment with that of the annular recess. Thus, it is possible to obtain a pressure sensor for low pressure by increasing the width e of the annular recess while decreasing the thickness h. To the contrary, a pressure sensor for high pressure is obtained by decreasing the width e while increasing the thickness h.

FIG. 18 is a plan view of a first modification of the third embodiment of the invention in which a central thick wall part 301a and a peripheral thick wall part 301b are separated from each other by a square thin wall part 301c. Tangential piezoresistance elements 311a and radial piezoresistance elements 311b are formed by diffusion process above the thin wall part 301c. This arrangement offers the same advantages as those produced by the third embodiment. In addition, since the piezoresistance elements 311a and 311b are arranged parallelly or perpendicularly to the adjacent sides of the thin wall part 301c, the stress distribution on each piezoresistance element both in the lengthwise and breadthwise direction is uniformalized to further enhance the accuracy of the pressure sensor.

FIG. 19 shows a second modification of the third embodiment. This second modification is an improvement of the first modification explained in connection with FIG. 18. The radial piezoresistance element 311, which is disposed in the radial direction of the silicon diaphragm, i.e. across the breadth of the recess, is liable to be affected by the steep stress gradient along the breadth of the annular groove, if the length of this element is large, so that the stress received by the piezoresistance element tends to be changed to cause a fluctuation in the output level. To avoid this problem, it is necessary to minimize the effective length of the radial piezoresistance element. According to the second modification shown in FIG. 19, a plurality of short segments of piezoresistance element are disposed in the center of the recess and are connected in parallel, so that the fluctuation of the output characteristics is suppressed without imparing the output sensitivity of the piezoresistance element.

FIG. 21 shows a third modification of the third embodiment, in which the thin wall part 301c is not made continuous but is separated into sections 301c and the piezoresistance elements 311 are formed at positions corresponding to respective sections of the thin wall part 301c. With this arrangement, it is possible to enjoy the advantages of the preceding embodiment and, in addition, the maximum stress $\sigma_S$ in the silicon diaphragm shown in FIG. 14 and the maximum stress $\sigma_G$ in the joint surface $\sigma_G$ can be further diminished thanks to the reduced area of the thin wall part 201c constituting the strain generating portion. This feature is quite advantageous from the view point of strength.

As will be seen from the foregoing description, in the pressure sensor of this embodiment, the diaphragm is fixed at its central portion to the base, thereby to increase the rigidity of the silicon diaphragm, so that the levels of the stresses generated in every parts of the sensor are decreased by 30 to 50% as compared with the conventional pressure sensor for obtaining the same level of output.

In addition, since the thin wall part constituting the strain generating portion is distinctively separated from the stationary part, various factors derived from the stationary part and adversely affecting the output characteristics, e.g. the influence of the strain or the like caused in the bonding between the silicon diaphragm and the base, and influence of the thermal or mechanical distorsions caused by the difference in the mechanical properties among the adhesive, base and the silicon can be diminished to ensure a higher stability and reliability of the output from the sensor.

It is also to be noted that the piezoresistance elements can be always located at positions where the sensor output takes the highest level, without requiring any change in the arrangement of the piezoresistance elements and shape and size of the diaphragm. It is, therefore, possible to produce pressure sensors adapted to various pressures including low pressure and high pressure, simply by modifying the internal structure. In consequence, according to this embodiment, it is possible to produce various classes of pressure sensors suited to various levels of pressures, through a simplified production process and, hence, at a reduced cost.

EXPERIMENT 2

Stress distribution was measured with a diaphragm shown in FIG. 17, in which the factors $V_G$, h, t and e were selected to be 0.700 mm, 0.1 mm, 0.18 mm and 0.250 mm, respectively. The result of the measurement is shown in FIGS. 20a, 20b and 20c. From FIG. 20a, it will be understood that the radial stress $\sigma_r$ and, hence, the stress difference $\Delta \sigma = \sigma_r - \sigma_t$ take the maximum value at the center of the recess.

What we claim is:

1. A pressure sensor of semiconductor type, comprising a semiconductor diaphragm having upper and lower surfaces and including at least one of thin wall parts provided by forming at least one recess in said lower surface and at least one of thick wall parts, said thin wall parts having such a thickness and a shape that local flexibility arises in said upper surface in said thick wall parts, piezoresistance elements each laid on said upper surface in an area outside the area of the at least one recess where the local flexibility arises, and a supporting member jointed to said thick wall parts at said lower surface for supporting said diaphragm.

2. A pressure sensor as set forth in claim 1, wherein said semiconductor diaphragm is made of a silicon single crystal plate.

3. A pressure sensor as set forth in claim 2 wherein said each thin wall part is a circular shape having a radius (a), and said each piezoresistance element is laid at a position of 1.25a to 1.4a from the center of said thin wall part.

4. A pressure sensor as set forth in claim 2, wherein said silicon single crystal plate is formed from an N-type silicon single crystal having a surface orientation of {100} and at least one piezoresistance element is formed in the surface orientation of {110}.

5. A pressure sensor as set forth in any one of claims 1 to 4, wherein said supporting member is made of borosilicate glass and is jointed to said diaphragm by electrostatic bonding.

6. A pressure sensor of semiconductor type, comprising a semiconductor diaphragm in the upper and lower surfaces and including at least one of thin wall parts provided by forming at least one recess in said lower surface and at least one of thick wall parts, said thin wall parts having such a thickness and a shape that local flexibility arises in said upper surface in said thick wall parts, piezoresistance elements each laid on said upper surface in an area where the local flexibility arises, and a supporting member jointed to said thick wall parts at said lower surface for supporting said diaphragm, said thick wall part having a transient region in which the local flexibility arises and which is adjacent said thin wall part, the thickness of said transient region of said thick wall part adjacent to said thin wall part being gradually decreased towards said thin wall part, said piezoresistance elements being laid on said upper surface only in said transient region.

7. A pressure sensor as set forth in claim 6, wherein said semiconductor diaphragm is made of a silicon single crystal plate.

8. A pressure sensor as set forth in any one of claims 6 and 7, wherein said supporting member is made of borosilicate glass and is jointed to said diaphragm by electrostatic bonding.

* * * * *